United States Patent [19]

Rappinger et al.

[11] Patent Number: 4,853,941
[45] Date of Patent: Aug. 1, 1989

[54] D.C. ARC FURNACE HAVING ELECTRICALLY CONDUCTIVE HEARTH AND METHOD FOR MAKING SAME

[75] Inventors: Bo Rappinger; Sven-Einar Stenkvist, both of Västerås, Sweden

[73] Assignee: Asea Brown Boveri AB, Västerås, Sweden

[21] Appl. No.: 168,899

[22] Filed: Mar. 16, 1988

Related U.S. Application Data

[63] Continuation-in-part of Ser. No. 829,296, Feb. 13, 1986, abandoned.

[30] Foreign Application Priority Data

Feb. 21, 1985 [SE] Sweden .................. 8500837

[51] Int. Cl.4 .................. B29C 71/02; F27D 1/04; F27D 1/16
[52] U.S. Cl. .................. 373/72; 264/29.1; 264/30; 264/345
[58] Field of Search .................. 264/30, 66, 29.1, 29.5, 264/29.6, 29.7, 105, 344, 345; 373/72, 73, 75, 108; 501/100, 101, 90; 252/506, 508, 509

[56] References Cited

U.S. PATENT DOCUMENTS

| 1,577,124 | 3/1926 | Jackman | 264/66 |
|---|---|---|---|
| 3,202,519 | 8/1965 | Scott | 106/56 |
| 3,640,518 | 2/1972 | Lythe et al. | 264/345 X |
| 3,994,676 | 11/1976 | Strimple et al. | 264/30 X |
| 4,185,055 | 1/1980 | Barrilon et al. | 264/29.5 |
| 4,228,314 | 10/1980 | Stenkvist . | |
| 4,324,943 | 4/1983 | Stenkvist et al. | 373/72 |
| 4,468,782 | 8/1984 | Stenkvist | 373/84 |
| 4,471,059 | 9/1984 | Yoshino et al. | 501/96 |
| 4,541,099 | 9/1985 | Rappinger et al. | 373/72 |
| 4,569,835 | 2/1986 | Di Ció et al. | 264/29.1 X |
| 4,684,480 | 8/1987 | Lipp et al. | 264/29.1 X |
| 4,692,930 | 9/1987 | Radke et al. | 373/72 |
| 4,701,427 | 10/1987 | Boecker et al. | 501/90 X |
| 4,710,480 | 12/1987 | Buschmann et al. | 501/90 X |

Primary Examiner—Jan H. Silbaugh
Assistant Examiner—Karen D. Kutach
Attorney, Agent, or Firm—Kenyon & Kenyon

[57] ABSTRACT

A new method of making an electrically conductive hearth in a d.c. furnace is effected by first heating bricks such as magnesite-graphite bricks and the like, from their new commercially available form to high temperatures decresing the normal resistivity of the bricks and thereafter laying the bricks to form the hearth from top to bottom with the heat treated bricks.

3 Claims, 1 Drawing Sheet

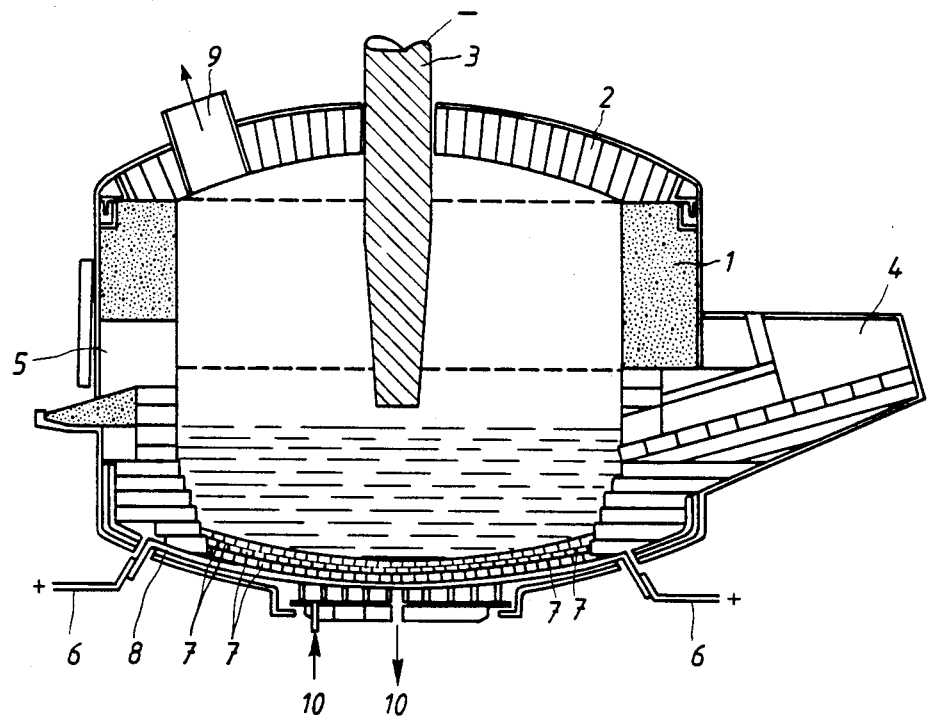

D.C. ARC FURNACE HAVING ELECTRICALLY CONDUCTIVE HEARTH AND METHOD FOR MAKING SAME

This is a continuation-in-part of application Ser. No. 829,296 filed Feb. 13, 1986, now abandoned.

A d.c. arc furnace has at least one depending arcing electrode above a bottom electrode on which an electrically conductive hearth is made below the arcing electrode. Examples are disclosed by the Stenkvist U.S. Pat. No. 4,228,314 and by the Stenkvist and Rappinger U.S. Pat. No. 4,324,943.

In the above patents the bottom electrode is in the form of an electrically conductive metal plate and the hearth is built by layers of carbon bricks laid on the plate and covered by electrically non-conductive refractory material which shields the carbon bricks from a furnace melt on the hearth heated by the arcing electrode. The arcing power must be carried through the hearth and the melt to the arcing electrode and for this both patents suggest the use of a cluster of electrically conductive metal rods which extend through the electrically non-conductive hearth with their bottom ends in electrical contact with the carbon bricks and their top ends exposed to the melt.

Carbon bricks are undesirably expensive and both patents suggests their replacement by magnesite-graphite bricks containing about 20% graphite because they are substantially less expensive than the carbon bricks.

Magnesite-graphite bricks are commercially obtainable and are composed of 5-30% graphite, the remainder being oxide materials such as magnesite or alumina plus a bonding material such as tar, pits, or resin, tempered at temperatures of 150°-350° C. It is possible to use as the oxide materials other than magnesite, as in dolomite-graphite, chamotte-graphite, silicon-carbide-graphite, zircon-graphite, zirconia-graphite, aluminum oxide-graphite bricks all of which can be grouped under the term magnesite-graphite bricks and the like. They all include the bonding material and of course the graphite, and in all cases are produced by the brick manufacturer tempered so they can be handled and laid as are carbon bricks or, in other words, by using customary brick laying methods.

The present inventors are the same Stenkvist and Rappinger of the previously identified patents. A new hearth is of course made from new materials and eventually it was realized that if the carbon bricks described by the patents are replaced by new commercially available magnesite-graphite bricks, electrical over-heating of the hearth takes place because of their high electrical resistivity when subjected to the rapid use of full bottom electrode current as required by certain processes. When new magnesite-graphite bricks and the like are used to make the hearth, this problem is exaggerated if the magnesite-graphite bricks are laid so as to form the hearth entirely from these bricks, eliminating the top electrically non-conductive material and the metal conductors required for conductivity.

As a brief summary of the present invention, the carbon bricks are replaced by new commerically available bricks of the magnesite-graphite type which prior to being laid on the bottom metal electrode of the furnace, are heated to temperatures coking material having a volatile component such as tar and the like and reducing the normal electrical resistivity of the bricks below the electrical resistivity of the bricks before the heating. Heating temperatures of 350°-1000° C. are suitable, but it has been found preferable to rely on the 1000° C. temperature. Thereafter, the new heat treated bricks are laid on the bottom electrode to replace the carbon bricks previously referred to and preferably so as to form the complete hearth composed from top to bottom of the heat treated magnesitegraphite bricks.

The accompanying drawing illustrates by a vertical cross-section a d.c. arc furnace in which this new hearth construction is made.

The above drawing shows the furnace side wall 1 covered by the roof 2 through which the arcing electrode 3 depends. The furnace has a tapping spout 4 and a slag door 5. The bottom electrode or plate electrical connection 6 is in the same form as described by the previously mentioned patents and on which the new hearth 7 is made. In the drawing the parts numeral 6 are the terminals which connect with the bottom electrode 8. The roof 2 has a smoke outlet 9 and the bottom metal electrode plate may be centrally water cooled as is shown at 10.

According to the new method of making the hearth as a first step new commercially available magnesite-graphite bricks and the like are heated to temperatures above 350° C. and preferably to 1000° C. in a reducing atmosphere until the volatile components of the bricks are driven off, the volatile component normally being tar, resin and the like. This results in coking, and the desired result can be ascertained by measuring the resistivity of the heat-treated bricks to make certain that their electrical resistivity has been reduced substantially to below the electrical resistivity the new bricks had before the heating.

Examples are provided below:

| New Bricks | | | |
|---|---|---|---|
| Quality | | New Bricks after 1000° C. Heating | |
| A | 10% residual % C | $2 \cdot 10^{-3}$ Ohm m | $1,7 \cdot 10^{-4}$ Ohm m |
| B | 14% residual % C | $3,3 \cdot 10^{-4}$ Ohm m | $5,7 \cdot 10^{-5}$ Ohm m |
| C | 14% residual % C | $1,3 \cdot 10^{-3}$ Ohm m | $4,1 \cdot 10^{-5}$ Ohm m |
| | | After Coking at 800° C. | |
| D | 15% graphite | $7,2 \cdot 10^{-4}$ Ohm m | $9 \cdot 10^{-5}$ Ohm m |
| E | 20% graphite | $2,8 \cdot 10^{-4}$ Ohm m | $5,3 \cdot 10^{-3}$ Ohm m |

The above shows that the resisitivity of the new bricks is substantially decreased by the heat treatment shown as compared to that of the normal commercially available new tempered bricks.

After this step of the new method the hearth is made by laying the bricks on the bottom electrode 8. The drawing shows the hearth as being made entirely from top to bottom of the heat treated bricks which can be laid by the usual bricklaying techniques. It is possible to lay the bricks intermixed with electrically non-conductive bricks which have better heat insulation value, examples being graphite-free magnesite or aluminum oxide bricks, or chamotte. In this way, the heat treated conductive bricks replace the metal conductors of the patents.

An electric furnace is, of course, used to melt metals, particularly ferrous metals, so the operating temperature of an electric furnace is inherently very high, temperatures of 1500° C. and substantially higher being conventional, this having reference to the melt temperature. But, this is not so during start-up on a new furnace hearth and even during operation the bottom layer of the hearth resting on the water-cooled bottom electrode plate may not reach temperatures close to the melt temperature. This new method of first heat treating the normal new magnesite-graphite bricks and the like to the temperatures described and particularly to 1000° C. makes the start-up temperature of the new hearth less material. By this new method of making an electrically conductive hearth in a d.c. arc furnace it is possible to use commercially available magnesite-graphite bricks and the like in many instances to replace the more expensive carbon bricks. The entire hearth from top to bottom can be made of the less expensive heat treated bricks of the magnesite-graphite and the like type for carrying the electrical power from the furnace's bottom electrode to the melt.

We claim:

1. A d.c. arc furnace having a depending arcing electrode disposed above a bottom electrode, the arc furnace having a hearth made on top of the bottom electrode and disposed below the arcing electrode, said hearth being electrically conductive and being made of bricks laid on the bottom electrode, the bricks being electrically conductive tempered magnesite-graphite bricks containing material having a volatile component and having an initial resistivity prior to heat treating the bricks before being used in the hearth being heat treated at temperatures both coking the material having the volatile component and reducing the electrical resistivity of the bricks below the initial electrical resistivity, the conductive brick hearth being composed from top to bottom of said heat treated magnesite-graphite bricks and being in electrical contact with the bottom electrode and molten metal when the furnace is in use.

2. The d.c. arc furnace as recited in claim 1 wherein the bottom electrode comprises an electrically conductive metallic part in contact with the hearth bricks.

3. The d.c. arc furnace as recited in claim 2 wherein the electrically conductive metallic part is cooled.

* * * * *